(12) United States Patent
Schiebáhn

(10) Patent No.: US 8,686,843 B2
(45) Date of Patent: Apr. 1, 2014

(54) MOTOR VEHICLE WITH WARNING SYSTEM

(75) Inventor: Michael Schiebáhn, Wesseling (DE)

(73) Assignee: GM Global Technology Operations LLC, Detroit, MI (US)

( * ) Notice: Subject to any disclaimer, the term of this patent is extended or adjusted under 35 U.S.C. 154(b) by 189 days.

(21) Appl. No.: 13/248,169

(22) Filed: Sep. 29, 2011

(65) Prior Publication Data

US 2012/0081219 A1    Apr. 5, 2012

(30) Foreign Application Priority Data

Sep. 29, 2010    (DE) .................... 10 2010 046 915

(51) Int. Cl.
*B60Q 1/00* (2006.01)
*H04R 1/02* (2006.01)

(52) U.S. Cl.
USPC ........................................ 340/436; 381/389

(58) Field of Classification Search
USPC ............ 340/135, 433, 435, 436, 903; 381/86; 342/70
See application file for complete search history.

(56) References Cited

U.S. PATENT DOCUMENTS

| | | | |
|---|---|---|---|
| 4,528,563 A * | 7/1985 | Takeuchi | 340/903 |
| 5,450,057 A | 9/1995 | Watanabe | |
| 6,493,612 B1 * | 12/2002 | Bisset et al. | 701/23 |
| 6,856,874 B2 | 2/2005 | Weilkes et al. | |
| 6,919,917 B1 * | 7/2005 | Janssen | 348/143 |
| 7,046,128 B2 * | 5/2006 | Roberts | 340/436 |
| 7,057,505 B2 * | 6/2006 | Iwamoto | 340/463 |
| 7,982,591 B2 * | 7/2011 | Jeng et al. | 340/436 |
| 8,050,863 B2 * | 11/2011 | Trepagnier et al. | 701/514 |
| 2003/0108212 A1 * | 6/2003 | Yun | 381/86 |
| 2003/0141967 A1 | 7/2003 | Aichi et al. | |
| 2003/0156019 A1 | 8/2003 | Lehmann | |
| 2003/0227395 A1 * | 12/2003 | Zeineh | 340/988 |
| 2006/0190147 A1 | 8/2006 | Lee et al. | |

(Continued)

FOREIGN PATENT DOCUMENTS

| | | |
|---|---|---|
| DE | 382772 A1 | 3/1990 |
| DE | 19947766 A1 | 5/2001 |

(Continued)

OTHER PUBLICATIONS

German Patent Office, German Search Report for Country Application No. 10 2010 046 915.7, dated Jun. 1, 2011.

(Continued)

*Primary Examiner* — Hai Phan
*Assistant Examiner* — Royit Yu
(74) *Attorney, Agent, or Firm* — Ingrassia Fisher & Lorenz, P.C.

(57) ABSTRACT

A motor vehicle includes, but is not limited to an environment sensor for identifying a source of danger external to the vehicle and detecting at least one first direction in which the source of danger lies when viewed from the vehicle, and a loudspeaker arrangement which can be triggered, when a source of danger has been identified, to generate a warning signal which for a listener in a passenger cell of the vehicle appears to come from the first direction. The environment sensor is furthermore equipped to trigger the loudspeaker arrangement to produce a second signal following the warning signal, which for the listener appears to come from a second direction different from the first direction.

13 Claims, 2 Drawing Sheets

(56) References Cited

U.S. PATENT DOCUMENTS

2008/0136626 A1* 6/2008 Hudson et al. ............ 340/540
2008/0167757 A1* 7/2008 Kanevsky et al. ............ 701/1
2010/0060441 A1* 3/2010 Iwamoto .................... 340/435

FOREIGN PATENT DOCUMENTS

| DE | 10118903 | A1 | 11/2002 |
| DE | 10300275 | A1 | 8/2003 |
| DE | 10331235 | A1 | 2/2005 |
| DE | 102006047092 | A1 | 4/2008 |
| DE | 102007045932 | A1 | 4/2009 |
| EP | 2161174 | A | 3/2010 |
| JP | 2010061552 | A | 3/2010 |

OTHER PUBLICATIONS

UK IP Office, British Search Report for Application No. 1116180.9, dated Jan. 18, 2012.

* cited by examiner

MOTOR VEHICLE WITH WARNING SYSTEM

CROSS-REFERENCE TO RELATED APPLICATION

This application claims priority to German Patent Application No. 102010046915.7, filed Sep. 29, 2010, which is incorporated herein by reference in its entirety.

TECHNICAL FIELD

The technical field relates to a motor vehicle having a warning system that is suitable for drawing the attention of the vehicle driver to sources of danger surrounding the vehicle.

BACKGROUND

Known from DE 103 00 275 A1 is a warning system comprising an environment sensor for identifying a source of danger external to the vehicle and for detecting a direction in which the source of danger lies when viewed from the vehicle, as well as a loudspeaker arrangement which can be triggered when a source of danger has been identified in order to produce a warning signal which, for the driver of the vehicle, appears to come from the direction of the source of danger. The warning signal is intended to direct the attention of the driver in the direction of the source of danger in order to ensure that he recognizes the source of danger in good time and is in a position to counteract the danger arising from this in good time and correctly.

It is also known that many people do not react quickly and correctly in the presence of an acute danger but stare like the proverbial rabbit at the snake. They thereby certainly perceive the danger as such but at the same time are so irritated by the perception that they are not in a position to make the correct decisions in good time. The danger of this occurring is all the greater, the more threatening and the more confusing a danger situation is for the observer. The warning signal of the conventional system that is intended to guide the observer's gaze onto the source of danger at the same time brings with it the risk that the driver is even more irritated by the relationship between the warning signal and its apparent source, which is not immediately identifiable, than if the source of danger had not been perceived immediately. The time required by the driver in such a situation to understand what has been perceived is no longer available for an effective countermeasure.

Therefore, it is at least one object is to provide a motor vehicle with a warning system that is able to promote both a rapid perception of a danger situation by the driver and also a rapid and correct countermeasure. In addition, other objects, desirable features and characteristics will become apparent from the subsequent summary and detailed description, and the appended claims, taken in conjunction with the accompanying drawings and this background.

SUMMARY

A motor vehicle is provided having an environment sensor for identifying a source of danger external to the vehicle and detecting at least one first direction in which the source of danger lies when viewed from the vehicle, and a loudspeaker arrangement which can be triggered, when a source of danger has been identified, in order to generate an audible warning signal which for a listener in a passenger cell of the vehicle appears to come from the first direction, the environment sensor is furthermore equipped to trigger the loudspeaker arrangement to produce a second audible signal following the warning signal, which for the listener appears to come from a second direction different from the first direction. Since the attention of the listener is thus initially directed in the first direction onto the source of danger and then in the second direction away from the source of danger, a fixing of his attention on the source of danger is interrupted. Since the gaze of the driver is thus initially directed onto the source of danger and then in another direction, it is made easier for the driver to release his attention from the source of danger itself and turn it to a way in which the vehicle can be steered to avoid the source of danger.

Expediently the environment sensor is furthermore equipped to identify a region in the surroundings of the motor vehicle which can be safely reached by the motor vehicle and to trigger the loudspeaker arrangement to produce the second audible signal such that this appears to come from the relevant region.

As a result of one variant, instead of pointing directly at the relevant region, the second direction, from which the second signal appears to come, can be selected between two discrete directions which each correspond to a steering lock direction required to reach the region. In other words, the second signal can, for example, appear to come from the left for the driver in order to cause him to steer to the left and it can appear to come from the right in order to cause him to steer to the right.

As a result of an embodiment, the environment sensor can be switched between a first operating mode in which the second direction points to the identified region and a second operating mode in which the second direction is selected between two discrete directions. The first operating mode is particularly suitable for making it easier for the driver to avoid a source of danger when driving at high speed while the second operating mode is particularly helpful when maneuvering at low speed when the speed of the response is less important than the accuracy of the maneuvering. In consequence, it is furthermore expedient if the environment sensor is automatically able to switch between first and second operating mode depending on the speed of the vehicle.

In order to make it easier for the driver, even with restricted vision, to align the vehicle toward the region determined as safe by the environment sensor, particularly when maneuvering, the environment sensor can be equipped to produce the second audible signal until the vehicle is correctly aligned in the direction required to reach the region.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
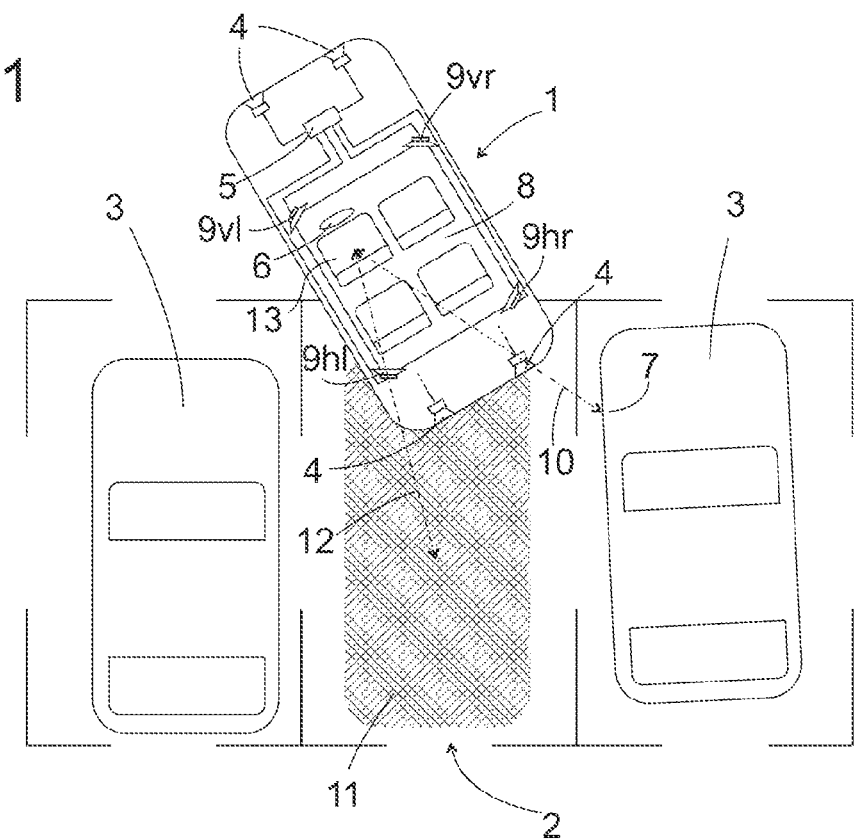
FIG. 1 shows a motor vehicle according to an embodiment in a first application situation.

FIG. 1 shows a schematic view of a motor vehicle 1, which is about to maneuver into a parking space 2 between two parking spaces already occupied by vehicles 3. An environment sensor of the motor vehicle 1 comprises a plurality of sensor units for collecting data describing the surroundings of the vehicle such as possibly camera 4, radar or ultrasound transmitter-receiver units or the like, which are distributed on the periphery of the body of the vehicle 1 in order to reconnoiter its surroundings, more accurately at least that part of the surroundings ahead of and behind the vehicle 1 which can be reached by steering without changing the direction of travel. The environment sensor further includes an evaluation unit 5 which calculates a three-dimensional model of the surroundings of the vehicle by means of images delivered by the camera 4. The evaluation unit 5 further receives a signal representative of the position of the steering wheel 6 or the wheels steered by it, by means of which the evaluation unit 5 is able to predict the path of the vehicle 1 in the three-dimensional environment model and calculate by means of this prognosis in particular a location 7 at which the vehicle 1 would bump into an obstacle such as one of the neighboring vehicles 3 if the driver does not correct the course of the vehicle, e.g., by turning the steering wheel 6 or influencing the vehicle speed.

Loudspeakers, preferably four, are disposed in a passenger cell 8 of the motor vehicle 1, which are here designated according to their arrangement on the vehicle by 9vl, 9vr, 9hl, 9hr. The loudspeakers 9vl, 9vr, 9hl, 9hr can be acted upon by the evaluation unit 5 with audio signals independently of one another. In the diagram in FIG. 1 an arrow 10 designates the direction, viewed from the perspective of the driver of the motor vehicle 1 in which, if the steering adjustment is not corrected, a collision with the neighboring parked vehicle 3 would occur. The evaluation unit 5 acts upon those two loudspeakers 9hl, 9hr located between the seat 13 of the driver and the danger location 7 with an audio warning signal, where the ratio of the phases and amplitudes with which the audio warning signal is fed into the two loudspeakers 9hl, 9hr is selected so that the driver perceives a single acoustic warning signal that appears to come from the direction 10. In order to be intuitively understandable for the driver, the warning signal can be modeled on a clattering or crunching noise.

With the aid of the environment model, the evaluation unit 5 is able to identify a region 11 in the environment of the vehicle which is sufficiently large to accommodate the vehicle 1. If several such regions 11 exist, the evaluation unit 5 selects that which can be reached with the smallest correction of the steering wheel position since this corresponds to the destination of the driver with the highest probability. An arrow 12 designates the direction in which, when viewed from the viewpoint of the driver, this region 11 can be reached. The evaluation unit 5 acts upon the loudspeakers 9hl, 9hr located on both sides of this region 12 between the driver's seat 13 and the region 11 with a second signal, where this time the amplitude and phase ratio of the audio signals fed into the loudspeakers 9hl, 9hr is specified in order to give the driver the impression of hearing a signal coming from the direction 12. The driver hearing and locating both signals knows the direction (10) from which danger threatens and the direction (12) in which he must align the vehicle 1 to avoid the danger.

Whereas the first warning signal is preferably an unpleasant noise which the driver instinctively associates with a disturbance or an unpleasant event, the following signal from the second direction on the other hand can be associated with a noise which is to be interpreted intuitively positively to direct the attention away from the source of danger and consequently can be clearly distinguished from the first warning signal. Instead of noise-like signals, the evaluation unit 5 can also output signals in speech form, for example in the form of a computer-generated statement of the type "caution danger to the right" or "please veer to the left", where possibly depending on the type of sensor units used and the degree of refinement of the signal processing, the type of danger such as "vehicle", "pedestrian", "curbstone" etc. can be specified.

Figure 2:
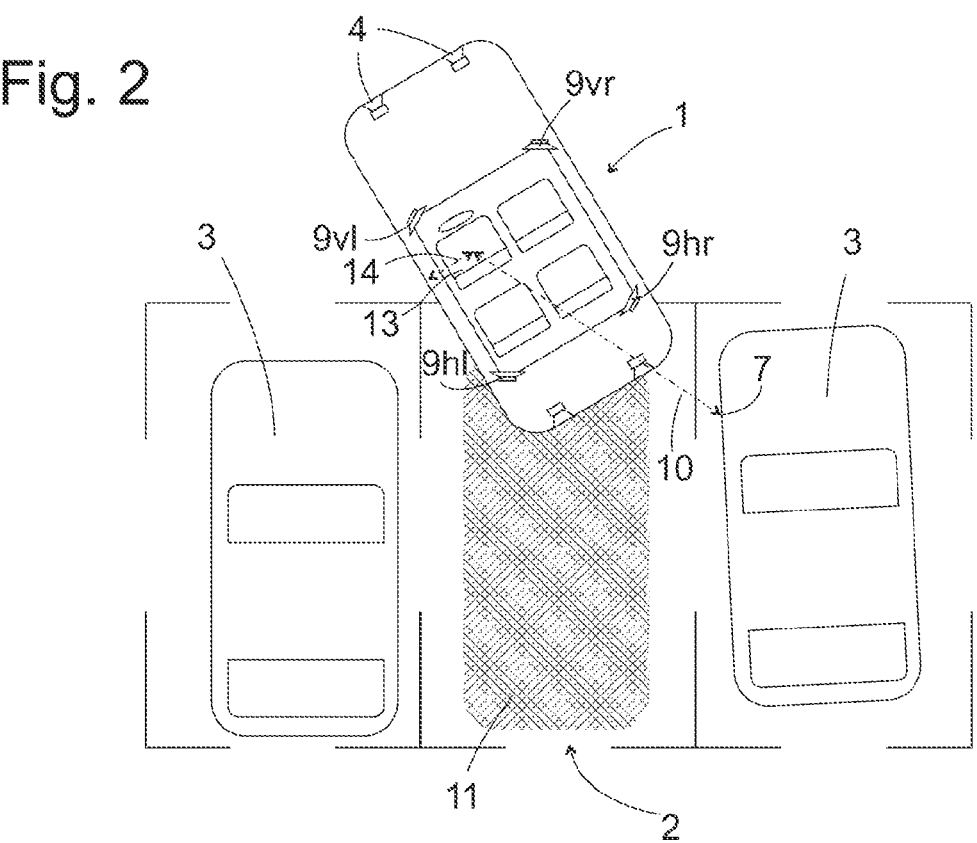
FIG. 2 shows a second embodiment of the vehicle in the application situation from FIG. 1.

FIG. 2 shows a second motor vehicle 1 according to the invention, again when maneuvering into a parking space 2 between two vehicles 3. The environment sensor of the vehicle 1 merely differs from that of FIG. 1 by the programming or operating mode of its evaluation unit 5. As in the first embodiment, the evaluation unit 5 initially predicts a location 7 at which the vehicle 1 would bump into one of the parked vehicles 3 if the steering wheel position is not corrected and thus outputs the warning signal via the loudspeakers 9hl, 9hr located between the driver and this location 7 such that it appears to the driver to come from the location 7. However, a second signal then generated is not output so that it appears to come from the region 11 to be controlled but from that side of the vehicle 1 to which the driver must turn the steering wheel 6 to avoid the collision at the location 7 and reach the region 11. In the case of FIG. 2, the loudspeakers 9vl, 9vr are triggered to give the driver the impression that a second audible signal is coming from a direction 14 to the left of his seat 13. The second signal is generated, continuously or intermittently, until the vehicle 1 is correctly aligned in order to reach the region 11. If the driver turns the steering wheel 6 too vigorously, it can then be provided that the evaluation unit 5 activates the loudspeakers 9vr, 9hr in order to give the driver the impression of a sound coming from the opposite direction and thus cause him to counter steer. In this way, the driver not only receives from the evaluation unit 5 an indication of the direction of travel expediently to be selected to avoid a danger but he additionally receives confirmation that the desired direction of travel is reached by the disappearance of the second signal. The restriction to two possible directions of origin of the second signal makes its location simple and reliable for the driver.

FIG. 3 again shows a motor vehicle 1 according to the invention but in a second application situation. The vehicle is moving on a road having several lanes 15, 16 and a drivable shoulder 17, for example, on a freeway. In front of the vehicle 1, two other vehicles 3 have just collided. The danger location 7 is now the back of the rear one of the two vehicles 3 involved in the accident. The evaluation unit 5 in turn triggers the two loudspeakers located between driver and danger location 7, in this case the front loudspeakers 9vl, 9vr of the vehicle 1 in order to give the driver the impression of a warning signal coming from the location 7 or from the direction 10.

If the distance between the vehicles 1, 3 is sufficient for this, it is expedient if the evaluation unit 5 triggers an emergency braking maneuver to bring the vehicle 1 to a stop in its lane 15. However, if the speed of the vehicle 1 is too high for such an emergency braking maneuver, a region 11 must then be found into which the vehicle 1 can swerve to avoid the collision. In the situation shown here, the parallel lane 16 is busy so that no suitable escape region is present here. The evaluation unit 5 finds such a region 11 on the shoulder 17 and activates the loudspeakers 9vl, 9vr to give the driver the impression of a second signal coming from this region 11. By directing the attention of the driver specifically away from the accident and to a possible escape route, the probability that the vehicle 1 according to the invention can avoid driving into the vehicles 3 involved in the accident is increased.

Figure 3:
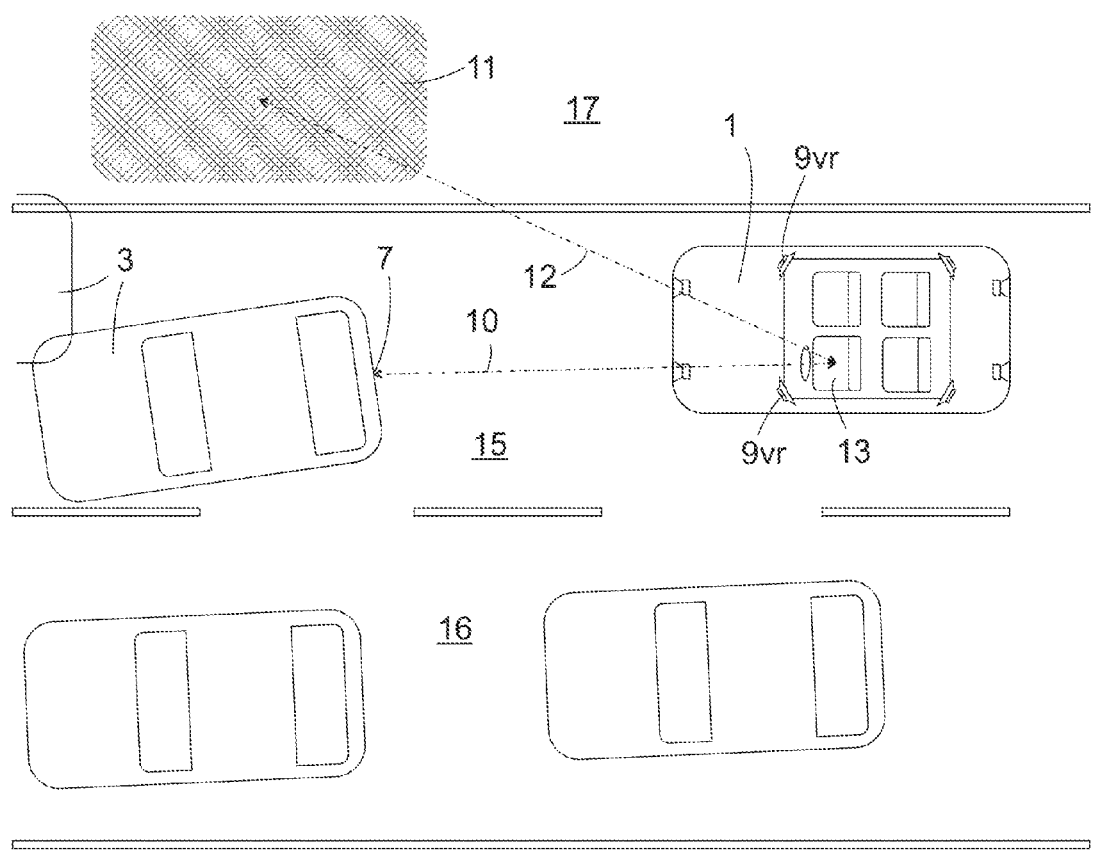
FIG. 3 shows a vehicle according to another embodiment in a second application situation.

The mode of operation of the evaluation unit 5 in the situation shown in FIG. 3 is substantially the same as in the case of FIG. 1 but differs from the functionality of FIG. 2. In order to combine the advantages of both functionalities, the evaluation unit 5 can expediently be equipped to switch between the operating mode described with reference to FIG. 2 and that described with reference to FIG. 3 depending on the driving speed of the motor vehicle 1, for example, in such a manner that at a speed below a limit of typically 5-20 km/h, the operating mode of FIG. 2 is used and at a speed above this limit, the functionality of FIG. 3 is used.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle, comprising:
an environment sensor configured to identify a source of danger external to the motor vehicle and further configured to detect a direction of a first direction of the source of danger from the motor vehicle; and
a loudspeaker arrangement configured to activate upon identification of the source of danger in order to generate a warning signal that appears to emanate from the first direction,
wherein the environment sensor is furthermore configured to activate the loudspeaker arrangement and produce a second signal following the warning signal that appears to emanate from a second direction that is different from the first direction; and
wherein the environment sensor is configured to identify a region in surroundings of the motor vehicle that is safely reachable by the motor vehicle and the second direction points towards the region.

2. A motor vehicle, comprising:
an environment sensor configured to identify a source of danger external to the motor vehicle and further configured to detect a direction of a first direction of the source of danger from the motor vehicle; and
a loudspeaker arrangement configured to activate upon identification of the source of danger in order to generate a warning signal that appears to emanate from the first direction,
wherein the environment sensor is furthermore configured to activate the loudspeaker arrangement and produce a second signal following the warning signal that appears to emanate from a second direction that is different from the first direction; and
wherein the environment sensor is configured to identify a region in surroundings of the motor vehicle that is safely reachable by the motor vehicle and the second direction is selected between two discrete directions that each correspond to a steering lock direction to reach the region.

3. A motor vehicle, comprising:
an environment sensor configured to identify a source of danger external to the motor vehicle and further configured to detect a direction of a first direction of the source of danger from the motor vehicle; and
a loudspeaker arrangement configured to activate upon identification of the source of danger in order to generate a warning signal that appears to emanate from the first direction,
wherein the environment sensor is furthermore configured to activate the loudspeaker arrangement and produce a second signal following the warning signal that appears to emanate from a second direction that is different from the first direction; and
wherein the environment sensor is configured to identify a region in surroundings of the motor vehicle that is safely reachable by the motor vehicle and switchable between a first operating mode in which the second direction points to the region and a second operating mode in which the second direction is selected between two discrete directions that each correspond to a steering lock direction to reach the region.

4. The motor vehicle according to claim 3, wherein the environment sensor is configured to switch between the first operating mode and the second operating mode depending on a speed of the motor vehicle.

5. The motor vehicle according to claim 1, wherein the environment sensor is configured to produce the second signal until the motor vehicle is aligned in the direction to reach the region.

6. The motor vehicle according to claim 1, wherein the loudspeaker arrangement comprises a plurality of loudspeakers, and wherein the plurality of loudspeakers are disposed in a passenger cell of the motor vehicle.

7. The motor vehicle according to claim 6, wherein the plurality of loudspeakers is communicatively coupled to an evaluation unit, and wherein the plurality of loudspeakers are configured to receive audio signals, from the evaluation unit, independently of one another.

8. The motor vehicle according to claim 1, wherein the environment sensor comprises a plurality of sensor units, wherein the plurality of sensor units are distributed on a periphery of a body of the motor vehicle, and wherein the plurality of sensor units are configured to collect data describing surroundings of the motor vehicle.

9. The motor vehicle according to claim 8, wherein the plurality of sensor units comprises at least one camera.

10. The motor vehicle according to claim 9, wherein the environment sensor further comprises an evaluation unit, the evaluation unit configured to calculate a three-dimensional model of surroundings of the motor vehicle using images delivered by the at least one camera.

11. The motor vehicle according to claim 10, wherein the evaluation unit is further configured to:
receive a signal representative of a position of a steering wheel of the motor vehicle;
predict a path of the motor vehicle in the three-dimensional model based on the received signal; and
calculate a location at which the motor vehicle will collide with an obstacle.

12. The motor vehicle according to claim 8, wherein the plurality of sensor units comprises one or more radar transmitter-receiver units.

13. The motor vehicle according to claim 8, wherein the plurality of sensor units comprises one or more ultrasound transmitter-receiver units.

* * * * *